(12) United States Patent
Eibl et al.

(10) Patent No.: US 7,841,323 B2
(45) Date of Patent: Nov. 30, 2010

(54) INTERNAL-COMBUSTION ENGINE HAVING A COOLED EXHAUST GAS RECIRCULATION SYSTEM AS WELL AS AN EXHAUST GAS MANIFOLD

(75) Inventors: Ruediger Eibl, Puergen (DE); Andreas Witt, Munich (DE); Claus Reulein, Munich (DE); Claus-Peter Schreck, Ottobrunn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 37 days.

(21) Appl. No.: 12/264,656

(22) Filed: Nov. 4, 2008

(65) Prior Publication Data

US 2009/0120418 A1    May 14, 2009

(30) Foreign Application Priority Data

Nov. 8, 2007    (DE) .................. 10 2007 053 126

(51) Int. Cl.
*F02B 47/08* (2006.01)
*F02B 47/10* (2006.01)
(52) U.S. Cl. ............................................. 123/568.12
(58) Field of Classification Search ........... 123/568.12, 123/568.13, 559.1, 41.31, 41.72, 41.67; 60/321, 60/320, 280, 605.1, 605.2; 440/89 B, 89 C
See application file for complete search history.

(56) References Cited

U.S. PATENT DOCUMENTS 4,711,088 A * 12/1987 Berchem et al. ............... 60/321
5,109,668 A * 5/1992 Lindstedt ...................... 60/310
5,873,242 A * 2/1999 Morishima et al. ............ 60/286
5,931,131 A * 8/1999 Hackett ..................... 123/90.38
5,931,140 A * 8/1999 Maloney ...................... 123/480
6,176,082 B1 * 1/2001 Shaffer ......................... 60/321
6,543,427 B2 * 4/2003 Kawasaki ................. 123/568.12
7,625,257 B1 * 12/2009 Broman et al. ............. 440/89 B
2001/0020363 A1    9/2001 Strahle et al.
2008/0087017 A1 * 4/2008 Van Nimwegen ............ 60/599

FOREIGN PATENT DOCUMENTS

| DE | 43 24 458 B4 | 1/1994 |
| DE | 195 41 362 C1 | 1/1997 |
| DE | 100 11 954 A1 | 9/2001 |

OTHER PUBLICATIONS

German Search Report dated Jul. 16, 2008 with English translation of relevant portions (Nine (9) pages).

* cited by examiner

*Primary Examiner*—Mahmoud Gimie
(74) *Attorney, Agent, or Firm*—Crowell & Moring LLP

(57) ABSTRACT

An internal-combustion engine contains at least one piston/cylinder unit containing a combustion chamber, having an intake path leading into the combustion chamber, an exhaust gas path leading out of the combustion chamber, and having an exhaust gas manifold. An exhaust gas recirculation path leads from the exhaust gas manifold into the intake path. A cooling device is provided for cooling the recirculated exhaust gas, wherein the cooling device cools the exhaust gas manifold, and the exhaust gas recirculation path branches off the cooled exhaust gas manifold.

17 Claims, 2 Drawing Sheets

INTERNAL-COMBUSTION ENGINE HAVING A COOLED EXHAUST GAS RECIRCULATION SYSTEM AS WELL AS AN EXHAUST GAS MANIFOLD

CROSS-REFERENCE TO RELATED APPLICATIONS

This application claims priority under 35 U.S.C. §119 to German Patent Application No. DE 10 2007 053 126.7, filed Nov. 8, 2007, the entire disclosure of which is herein expressly incorporated by reference.

BACKGROUND AND SUMMARY OF THE INVENTION

The invention relates to an internal-combustion engine having at least one piston/cylinder unit containing a combustion chamber, having an intake path leading into the combustion chamber, an exhaust gas path leading out of the combustion chamber and having an exhaust gas manifold, an exhaust gas recirculation path leading from the exhaust gas manifold into the intake path, and a cooling device for cooling the recirculated exhaust gas. The invention further relates to an exhaust gas manifold for such an internal-combustion engine.

An internal-combustion engine of the above-mentioned type is known, for example, from German patent document DE 100 11 954 A1. The cooling device for cooling the recirculated exhaust gas is formed by an exhaust gas heat exchanger, which is constructed as a component that is separate from the exhaust gas manifold and is fastened directly to the exhaust gas manifold. By means of a valve, a portion of the exhaust gas flow can be guided either through the exhaust gas heat exchanger into the exhaust gas recirculation pipe or directly into the exhaust gas recirculation pipe into the intake pipe or the intake path of the internal-combustion engine.

From German patent document DE 43 24 458 B4, a water-cooled exhaust gas manifold for an internal-combustion engine is known, which has a double-walled outer pipe, through which cooling liquid flows and which contains an exhaust-gas guiding inner pipe which is held in the outer pipe and, with the exception of fastening points, is thermally insulated from the outer pipe by an annular gap. By means of this cooled exhaust gas manifold, it is achieved that, when the internal-combustion engine is started, the exhaust gas is cooled only slightly so that a catalyst will rapidly reach its operating temperature. It is only in the upper temperature range, which considerably stresses the catalyst, that heat is withdrawn from the exhaust gas so that the catalyst will not be endangered by unacceptably high temperatures.

FIG. 3 of the present application illustrates an internal-combustion engine known per se, which has an intake path and an exhaust gas path.

The intake path for supplying the, in the illustrated example, four-cylinder internal-combustion engine 10 with fresh air or a fresh charge, which intake path as a whole has the reference number 8, leads from an air filter 12 through a charger turbine 14 of an exhaust gas turbocharger, then through a charge air cooler 16 and further through a throttle valve part 18 into an air intake plenum 20, which is connected by way of intake ports, respectively, with one of the piston cylinder units of the internal-combustion engine 10.

An exhaust gas path of the internal-combustion engine, which, as a whole, has the reference number 22, contains a double-flow exhaust gas manifold 24, from which the exhaust gas flows through the exhaust gas turbine 26 of the exhaust gas turbocharger, subsequently through a catalyst system 28 and finally through a muffler 30.

From the exhaust gas manifold 24, an exhaust gas recirculation pipe 32 leads through an exhaust gas recirculation cooler 34 and an exhaust gas recirculation valve 36 upstream of the air intake plenum 20 back into the intake path 8.

The valve opening area of the exhaust gas recirculation valve 36 is controlled in a manner known per se as a function of operating parameters of the internal-combustion engine.

The exhaust gas recirculation through the exhaust gas recirculation pipe 32, the exhaust gas recirculation cooler 34 and the exhaust gas recirculation valve 36 results in relatively high constructional expenditures, which require space and lead to additional components with corresponding additional mounting expenditures.

There is therefore needed an internal-combustion engine having a simplified construction of the exhaust gas recirculation system.

According to the invention, an internal-combustion engine having at least one piston/cylinder unit containing a combustion chamber, having an intake path leading into the combustion chamber, an exhaust gas path leading out of the combustion chamber, and having an exhaust gas manifold, an exhaust gas recirculation path leading from the exhaust gas manifold into the intake path, and a cooling device for cooling the recirculated exhaust gas, is provided. The cooling device for cooling the recirculated exhaust gas cools the exhaust gas manifold and the exhaust gas recirculation path branches off the cooled exhaust gas manifold.

In the case of the internal-combustion engine according to the invention, no individual cooling device or a cooling device constructed as a component to be mounted separately is required for cooling the recirculated cooling gas. On the contrary, the exhaust gas manifold cooled for protecting the catalyst system is also used for cooling the recirculated exhaust gas.

An exhaust gas manifold according to the invention contains a housing for the connection to the exhaust gas side of an internal-combustion engine. At least one exhaust gas duct is constructed in the housing, which exhaust gas duct can be connected to an exhaust gas duct of the internal-combustion engine and ends in at least one outlet opening connectable to an exhaust gas system of the internal-combustion engine. An exhaust gas recirculation duct, which originates from the exhaust gas duct and which ends in an exhaust gas recirculation opening, as well as a cooling device by which at least the exhaust gas flowing through the exhaust gas recirculation duct can be cooled, are provided.

Advantageous embodiments and further developments of the internal-combustion engine according to the invention as described herein.

Other objects, advantages and novel features of the present invention will become apparent from the following detailed description of one or more preferred embodiments when considered in conjunction with the accompanying drawings.

DETAILED DESCRIPTION OF THE DRAWINGS

In the following the same reference symbols are used for explaining FIGS. 1 and 2, as in the case of the embodiment of FIG. 3 known per se. Only the ranges deviating from the arrangement according to FIG. 4 are explained.

Figure 1:
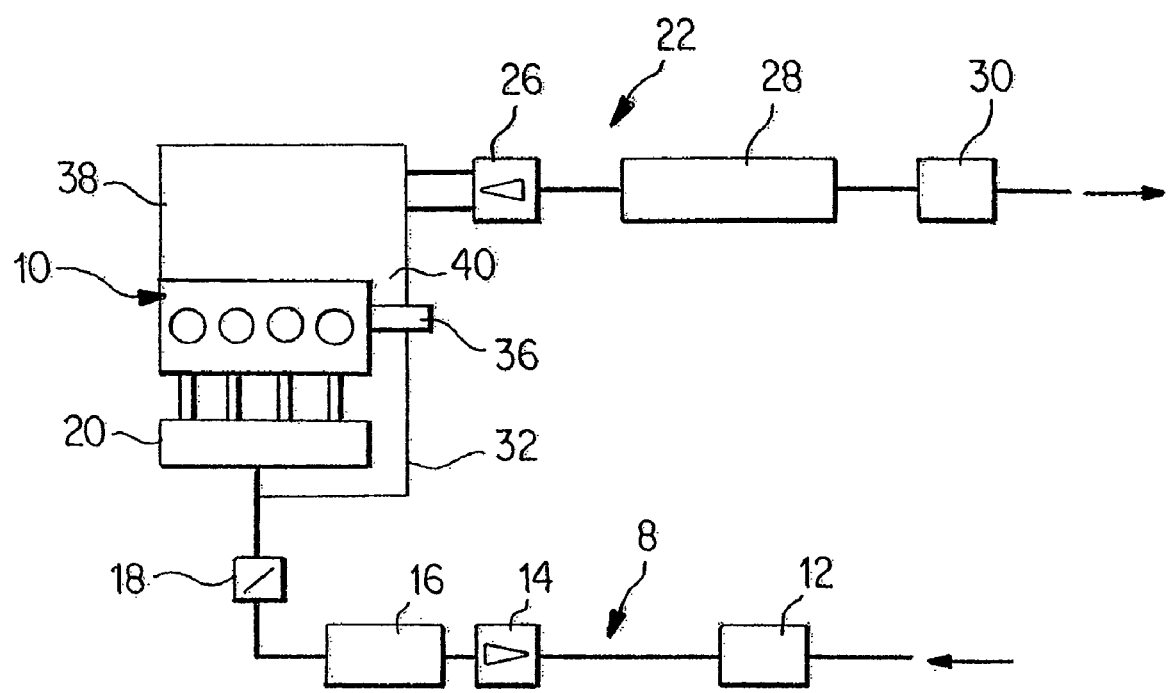
FIGS. 1 and 2 are schematic diagrams of basic arrangements of an internal-combustion engine with a pertaining intake path and exhaust gas path corresponding to two embodiments of the invention.
Figure 3:
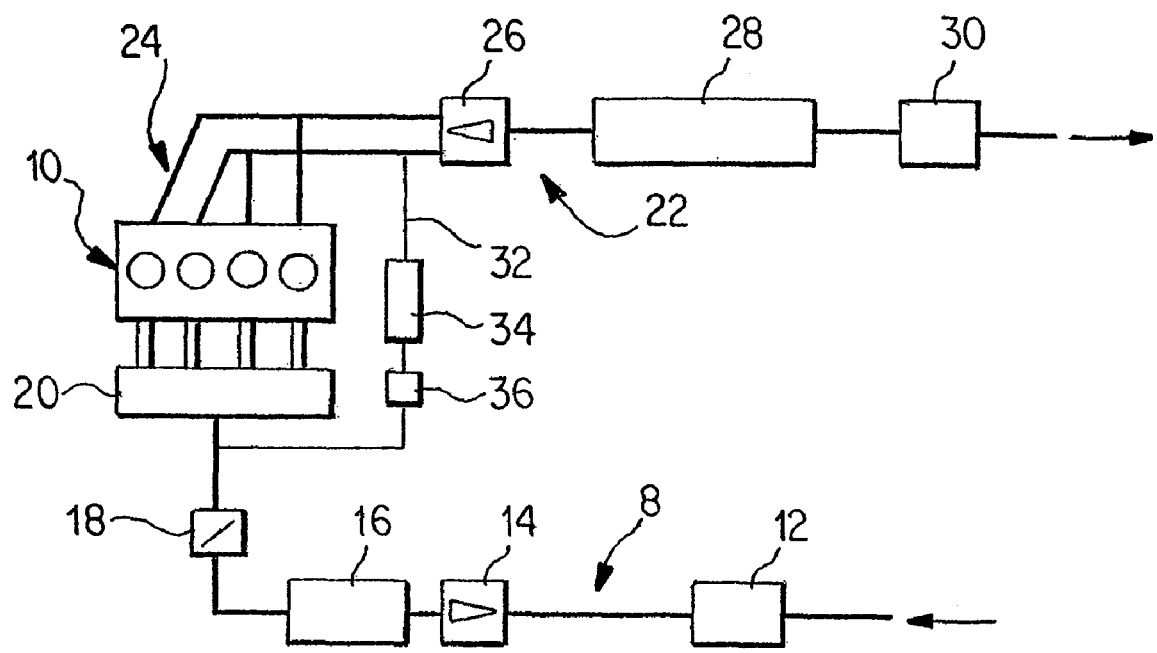
FIG. 3 is a schematic diagram of an internal-combustion engine known per se having an intake path and an exhaust gas path.
Figure 4:
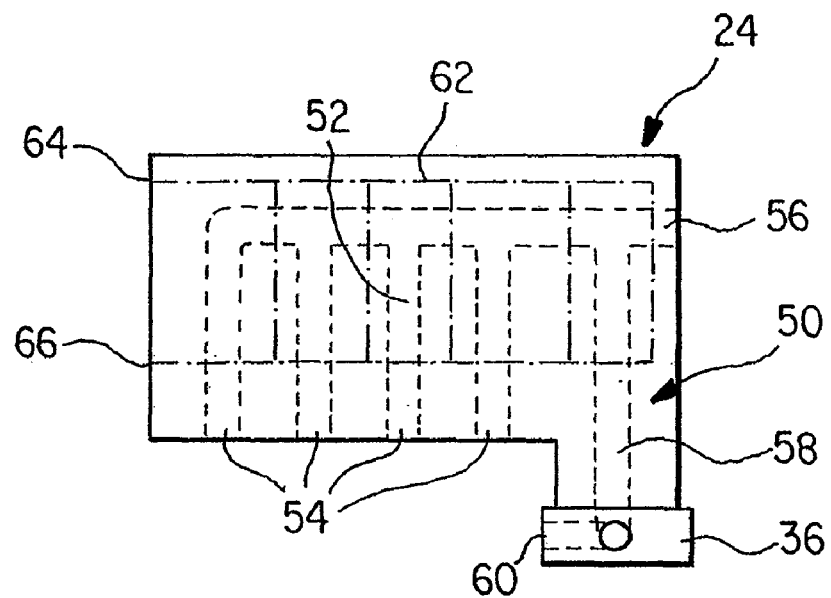
FIG. 4 is a simplified schematic view of a cooled exhaust gas manifold according to the invention.

As illustrated by a comparison between FIGS. 1 and 3, the exhaust gas recirculation cooler 34 of FIG. 3 is absent in the embodiment according to FIG. 1. The uncooled exhaust gas manifold 24 of FIG. 3 is replaced by an exhaust gas manifold 38 in which the exhaust gas, as a whole, leaving the internal-combustion engine 10 is cooled. The exhaust gas manifold 38 may, for example, be provided with integrated cooling in that it is flanged directly to the cylinder or engine block of the internal-combustion engine 10 and is connected with cooling ducts constructed in the cylinder head. These cooling ducts may be integrated in the exhaust gas manifold 38, which is preferably constructed in one piece, such that, in particular, an area 40 is also cooled from which the exhaust gas recirculation pipe 32 originates. As an alternative, the exhaust gas manifold 40 may also be provided with its own cooling system, for example, an air cooling system, in that the surface of the exhaust gas manifold 38, through which the exhaust pipes leading out of the individual piston-cylinder units extend, is considerably ribbed and cooling air flows around it in a targeted manner. Because of its cooling, the exhaust gas manifold 38 does not necessarily have to be constructed as a highly temperature-stable casting but may be constructed as an aluminum casting or sheet metal part.

The housing of the exhaust gas recirculation valve 36 is advantageously integrated in the exhaust gas manifold 38.

Figure 2:
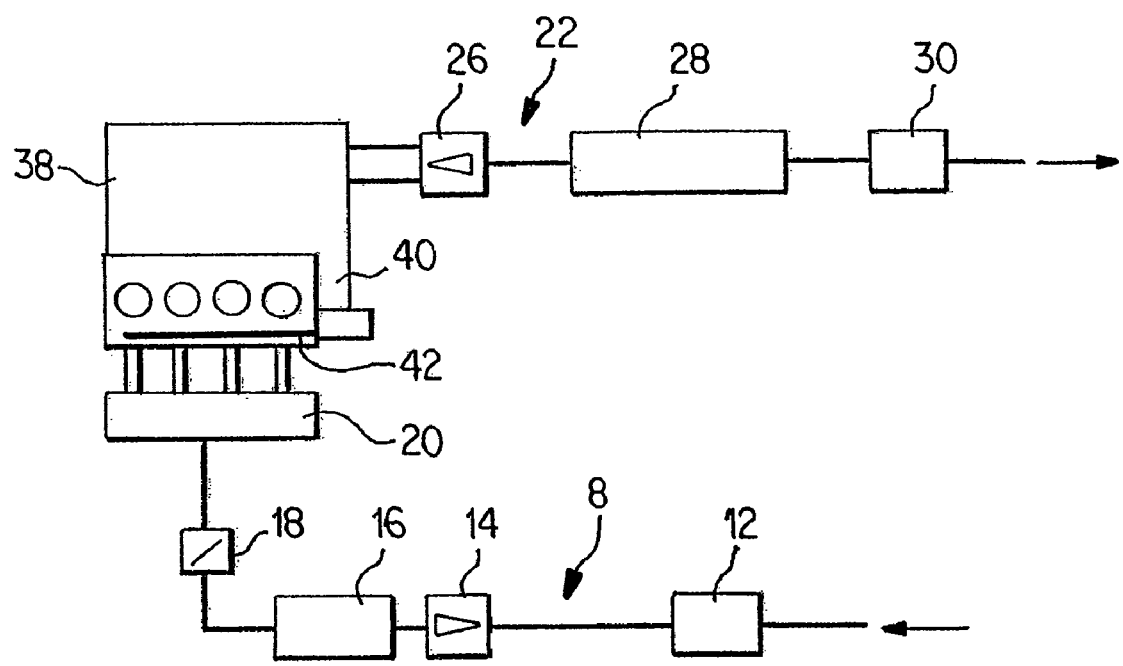

In contrast to the embodiment of FIG. 1, in the case of the embodiment according to FIG. 2, additional compactness is achieved in that the exhaust gas recirculation pipe 32 is not constructed as a separate pipe leading into the intake path 8 or the air intake plenum 20, but rather is integrated directly in the cylinder head of the internal-combustion engine 10. For this purpose, the exhaust gas recirculation pipe 32 is constructed, for example, directly as a duct 42, which is connected with the intake ports in the cylinder head leading to the individual combustion spaces, extends along the cylinder head, is cast into the cylinder head and whose end exposed at a face of the internal-combustion engine is directly connected with the exhaust gas recirculation valve 36.

By means of the arrangement according to FIG. 2, an extremely compact construction of the exhaust gas recirculation system is achieved, where the number of additional parts and the mounting expenditures are reduced to a minimum.

In a simplified representation, FIG. 4 schematically illustrates an exhaust gas manifold according to the invention. A housing 50 of the exhaust gas manifold 24 constructed, for example, as an aluminum casting, contains exhaust gas ducts 52 shown by parallel broken lines, which have intake openings 54 that can be connected to exhaust gas outlet openings constructed in the cylinder head of the internal-combustion engine. The exhaust gas ducts 52 connect these intake openings 54 with an outlet opening 56 that can be connected to the exhaust gas path 22. In the illustrated embodiment, the outlet of the exhaust gas manifold is a single-flow outlet. Another exhaust gas duct is constructed as an exhaust gas recirculation duct 58 and leads through the exhaust gas recirculation valve 36 to an outlet opening 60, which can be connected to the duct 42 integrated in the cylinder head.

Cooling ducts 62 constructed in the housing 50 and indicated by single dash-dotted lines lead from a coolant inlet 64 to a coolant outlet 66 and extend inside the housing 50 such that the exhaust gas ducts 52 are cooled corresponding to their purpose, in which case areas of the exhaust gas recirculation duct 58 can be cooled in a targeted manner as a result of a corresponding design.

The embodiments described as examples may be modified in multiple fashions.

The cooling of the exhaust gas manifold 38 may be connected with the cooling system of the internal-combustion engine. As an alternative, it may be connected with a cooling system by way of which at least one additional assembly of the vehicle, in which the internal-combustion engine is provided, is cooled, such as an automatic transmission, a generator, etc. It is also contemplated to connect the exhaust gas manifold with its own cooling system. Further, the cooled exhaust gas manifold may be constructed such that, in a targeted manner, the recirculated exhaust gas can be cooled more or less in that a control valve is integrated in the exhaust gas manifold by which, in a targeted manner, an area of an exhaust gas recirculation pipe integrated in the exhaust gas manifold is cooled more or less.

The cooled exhaust gas manifold may be a component that is separate from the cylinder head, such as an aluminum-cast component, or it may be cast integrally with the cylinder head. The exhaust gas manifold does not have to end with a dual-flow outlet, as illustrated, but may have a single-flow outlet.

The invention can largely be used for all types of internal-combustion engines, that is, supercharged internal-combustion engines and internal-combustion engines that are not supercharged (the supercharger turbine will then be absent) gasoline engines, diesel engines or gas engines, etc. The catalyst device 28 may have many different constructions known per se and may be composed of several catalytic converters.

| | Table of Reference Numbers |
|---|---|
| 8 | Intake path |
| 10 | internal-combustion engine |
| 12 | air filter |
| 14 | supercharger turbine |
| 16 | charge air cooler |
| 18 | throttle valve part |
| 20 | air intake plenum |
| 22 | exhaust gas path |
| 24 | exhaust gas manifold |
| 26 | exhaust gas turbine |
| 28 | catalyst system |
| 30 | muffler |
| 34 | exhaust gas recirculation cooler |
| 36 | exhaust gas recirculation valve |
| 38 | exhaust gas manifold |
| 40 | area |
| 42 | duct |
| 50 | housing |
| 52 | exhaust gas duct |
| 54 | intake opening |
| 56 | outlet opening |
| 58 | exhaust gas recirculation duct |
| 60 | outlet opening |
| 62 | cooling duct |
| 64 | coolant inlet |
| 66 | coolant outlet |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An internal-combustion engine, comprising:
   at least one piston/cylinder unit containing a combustion chamber;
   an intake path leading into the combustion chamber;
   an exhaust gas manifold in which a cooling device is integrated for cooling the recirculated exhaust gas, wherein the cooling device cools the exhaust gas manifold; and
   an exhaust gas recirculation path leading from the exhaust gas manifold into the intake path which path branches off the cooled exhaust gas manifold.

2. The internal-combustion engine according to claim 1, wherein the internal-combustion engine is liquid-cooled, and at least one cooling pipe connected to the cooling system of the internal-combustion engine is integrated in the exhaust gas manifold.

3. The internal-combustion engine according to claim 1, wherein the exhaust gas manifold is connected to a cooling system, which is separate from the cooling system of the internal-combustion engine.

4. The internal-combustion engine according to claim 1, wherein the exhaust gas manifold is constructed in one piece with a cylinder head of the internal-combustion engine.

5. The internal-combustion engine according to claim 2, wherein the exhaust gas manifold is constructed in one piece with a cylinder head of the internal-combustion engine.

6. The internal-combustion engine according to claim 3, wherein the exhaust gas manifold is constructed in one piece with a cylinder head of the internal-combustion engine.

7. The internal-combustion engine according to claim 1, wherein the cooling of at least one of the exhaust gas manifold and an area of the exhaust gas recirculation path contained in the exhaust gas manifold is variable as a function of operating parameters of the internal-combustion engine.

8. The internal-combustion engine according to claim 1, wherein the flow-through cross-section of the exhaust gas recirculation path is variable via an exhaust gas recirculation valve controllable as a function of operating parameters of the internal-combustion engine.

9. The internal-combustion engine according to claim 7, wherein the flow-through cross-section of the exhaust gas recirculation path is variable via an exhaust gas recirculation valve controllable as a function of operating parameters of the internal-combustion engine.

10. The internal-combustion engine according to claim 1, wherein the exhaust gas recirculation path within a cylinder head of the piston/cylinder unit leads into the intake path.

11. The internal-combustion engine according to claim 7, wherein the exhaust gas recirculation path within a cylinder head of the piston/cylinder unit leads into the intake path.

12. The internal-combustion engine according to claim 8, wherein the exhaust gas recirculation path within a cylinder head of the piston/cylinder unit leads into the intake path.

13. The internal-combustion engine according to claim 1, wherein the exhaust gas path leads downstream of the exhaust gas manifold through a catalytic converter system.

14. The internal-combustion engine according to claim 2, wherein the exhaust gas path leads downstream of the exhaust gas manifold through a catalytic converter system.

15. The internal-combustion engine according to claim 3, wherein the exhaust gas path leads downstream of the exhaust gas manifold through a catalytic converter system.

16. An exhaust gas manifold for an internal combustion engine, comprising:
    a housing operatively configured to couple with an exhaust gas outlet opening in a cylinder head of the internal combustion engine;
    at least one exhaust gas duct configured in the housing, said exhaust gas duct being operatively connected to an exhaust gas duct of the internal combustion engine and ending in at least one outlet opening connectable to an exhaust gas system of the internal combustion engine;
    an exhaust gas recirculation duct originating from the exhaust gas duct and ending in an exhaust gas recirculation opening; and
    a cooling device integrally arranged in the housing by which at least exhaust gas flowing through the exhaust gas recirculation duct is cooled.

17. A method of cooling an exhaust gas recirculation path of an internal combustion engine, the method comprising:
    recirculating exhaust gas through an exhaust gas manifold to an intake path leading into a combustion chamber of the internal combustion engine;
    integrating a cooling device with the exhaust gas manifold; and
    cooling, via the integrated cooling device, the recirculated exhaust gas within the exhaust gas manifold.

* * * * *